United States Patent
Schütz et al.

[11] 3,970,615
[45] July 20, 1976

[54] UNSYMMETRICAL MONO-SULFO CONTAINING CHROMIUM COMPLEXES OF AZO DYES

[75] Inventors: Hans Ulrich Schütz, Basel, Switzerland; Gerhard Back, Lorrach, Germany; Fabio Beffa, Riehen, Switzerland

[73] Assignee: Ciba-Geigy Corporation, Ardsley, N.Y.

[22] Filed: Dec. 24, 1974

[21] Appl. No.: 536,059

[30] Foreign Application Priority Data
  Jan. 10, 1974  Switzerland............... 287/74

[52] U.S. Cl. .............. 260/145 B; 260/162; 260/197; 260/310 A
[51] Int. Cl.² .............. C09B 45/06; C09B 45/16; C09B 45/48; D06P 3/24
[58] Field of Search ................ 260/145 B

[56] References Cited
FOREIGN PATENTS OR APPLICATIONS
243,954  11/1959  Australia................ 260/145 B
1,259,482  1/1968  Germany............... 260/145 B

*Primary Examiner*—Floyd D. Higel
*Attorney, Agent, or Firm*—Joseph G. Kolodny; Edward McC. Roberts; Prabodh I. Almaula

[57] ABSTRACT
Chromium complex dyes of the formula

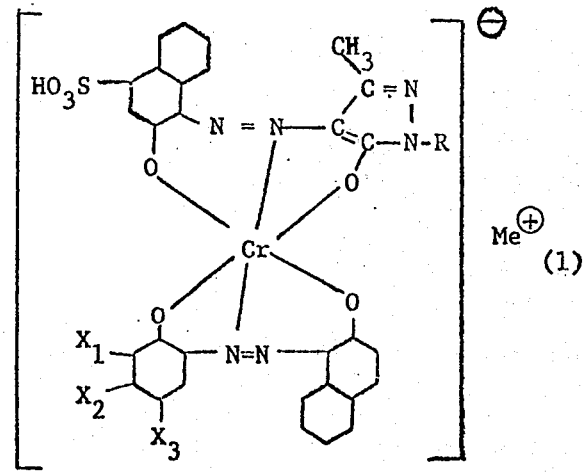

wherein one of the symbols $X_1$, $X_2$ and $X_3$ is hydrogen and each of the others is hydrogen, a halogen atom, a nitro group, a methyl or a methoxy group, R is a phenyl radical which is optionally substituted by halogen, low molecular alkoxy, alkyl or nitro and $Me^+$ is a cation are disclosed; said dyes being useful in dyeing synthetic and natural polyamides to produce dyeings which are level and have good fastness to light, washing, fulling, decatizing and carbonizing.

5 Claims, No Drawings

UNSYMMETRICAL MONO-SULFO CONTAINING CHROMIUM COMPLEXES OF AZO DYES

The present invention provides novel chromium complex dyes of the formula

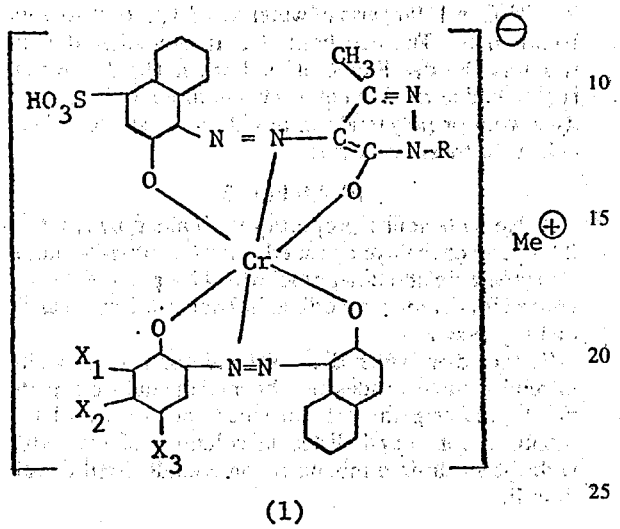

(1)

wherein one of the symbols $X_1$, $X_2$ and $X_3$ is hydrogen and each of the others is hydrogen, a halogen atom, a nitro group, a methyl or a methoxy group, R is a phenyl radical which is optionally substituted by halogen, low molecular alkoxy, low molecular alkyl or nitro and $Me^+$ is a cation. By halogen is meant principally chlorine and bromine and the term "low molecular" denotes radicals with 1 to 4 carbon atoms.

The novel chromium complex dyes are manufactured by converting one of the azo dyes of the formulae

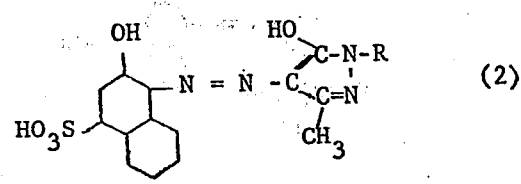

(2)

or

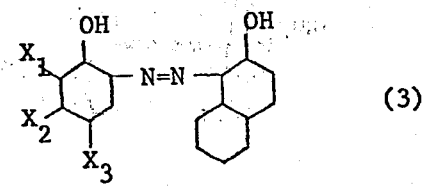

(3)

with a chromium donor into the 1:1 chromium complex and subsequently reacting this latter with the non-metallised dye of the formula (3) or (2). Preferably, the 1:1 chromium complex is manufactured from the dye of the formula (2) and the dye of the formula (3) is added thereto.

The monoazo dyes of the formula (2) are obtained in known manner by coupling diazotised 1-amino-2-hydroxynaphthalene-4-sulphonic acid to a 3-methyl-5-pyrazolone, and those of the formula (3) by coupling a diazotised aminophenol to β-naphthol.

Examples of suitable coupling components for dyes of the formula (2) are:
1-(2'-ethylphenyl)-3-methyl-5-pyrazolone
1-(4'-bromophenyl)-3-methyl-5-pyrazolone
1-(2'-chloro-6'-methylphenyl)-3-methyl-5-pyrazolone
1-(3'-nitrophenyl)-3-methyl-5-pyrazolone and especially
1-phenyl-3-methyl-5-pyrazolone
1-(2'-, 3'- or 4'-chlorophenyl)-3-methyl-5-pyrazolone
1-(2',5'- or 3',4'-dichlorophenyl)-3-methyl-5-pyrazolone
1-(2',5'-dibromophenyl)-3-methyl-5-pyrazolone
1-(2',4',6'-trichlorophenyl)-3-methyl-5-pyrazolone
1-(4'-methoxyphenyl)-3-methyl-5-pyrazolone.

Suitable diazo components for dyes of the formula (3) are:
2-amino-1-hydroxybenzene
4- or 5-chloro-2-amino-1-hydroxybenzene
4- or 5-nitro-2-amino-1-hydroxybenzene
4-methyl-2-amino-1-hydroxybenzene
4-methoxy-2-amino-1-hydroxybenzene
4,6-dichloro-2-amino-1-hydroxybenzene
4,6-dinitro-2-amino-1-hydroxybenzene
4-chloro-5-nitro-2-amino-1-hydroxybenzene
4-chloro-6-nitro-2-amino-1-hydroxybenzene
6-chloro-4-nitro-2-amino-1-hydroxybenzene
6-nitro-4-methyl-2-amino-1-hydroxybenzene.

Preferred aminophenols are those which carry no substituents other than a nitro group or especially a chlorine atom or a methyl group. Preferably these substituents are in para-position to the hydroxy group.

The conversion of one of the dyes of the formula (2) or (3) into the 1:1 chromium complex is accomplished by conventional methods which are known per se, e.g. by reacting it in an acid medium with a salt of trivalent chromium, e.g. chromium formate, chromium sulphate, chromium chloride hexahydrate or chromium fluoride, at boiling temperature or optionally at temperatures exceeding 100°C. Trivalent chromium can also be obtained in known manner from chromium-(VI) compounds, e.g. chromate, by adding a reducing agent, e.g. butanol, to reaction mixture. In general it is advisable to carry out the metallising for example in the presence of organic solvents, such as alcohols or ketones.

It is normally advantageous not to dry the starting dyes required in the present process after their manufacture and precipitation, but to process them further as a moist paste.

The reaction of the 1:1 chromium complex of the dye of the formula (2) or (3) with the metal-free dye of the formula (3) or (2) is desirably carried out in a neutral to weakly alkaline medium, in an open or a sealed vessel, and at normal or elevated temperature, e.g. at temperatures between 50° and 120°C. The process can be carried out in organic solvents, e.g. alcohols or ketones or in an aqueous solution, in which case the addition of solvents, e.g. alcohols, formamide etc., can promote the reaction if so desired. It is usually advisable to react as far as possible equivalent amounts of the chromium-containing 1:1 complex and the metal-free dye, the molecular ratio between metal-free dye and 1:1 complex being desirably at least 0–85:1 and at most 1:0.85. A surplus of metal-containing dye is usually less disadvantageous than one of metal-free dye.

The closer this ratio is to 1:1 the more advantageous the result generally is.

Instead of homogeneous dyes of the formula (2) or (3), it is also possible to use mixtures of corresponding azo dyes. Particularly interesting shades are obtained in this way.

The novel chromium-containing mixed complexes obtained by the above processes are isolated with advantage in the form of their salts, in particular alkali salts, above all sodium salts, or also ammonium salts or salts of organic amines with positively charged nitrogen atoms, and are suitable for dyeing and printing the most varied materials, but chiefly for dyeing materials made from natural polyamides, such as silk, leather, and especially wool, as well as for dyeing and printing synthetic polyamide fibres, e.g. fibres made from polyamides or polyurethanes. They are suitable above all for dyeing from a neutral or weakly acid bath, for example from an acetic acid bath.

The dyeings which are obtained are level and have good fastness to light, washing, fulling, decatising and carbonising.

The following Examples illustrate the invention, the parts and percentages being by weight unless otherwise stated.

EXAMPLE 1

47.4 parts of the 1:1 chromium complex of the monoazo dye obtained by coupling diazoxidic acid to 1-phenyl-3-methyl-5-pyrazolone and 29.85 parts of the monoazo dye obtained from 4-chloro-2-amino-1-oxybenzene and 2-naphthol are stirred for 3 hours at 90°–95°C in 1500 parts of water and 30 parts of sodium bicarbonate. The resultant dye is precipitated with sodium chloride, filtered off and dried. The dye, which is obtained in the form of a water-soluble dark powder, dyes wool or polyamide in bright, violet shades of excellent fastness properties.

EXAMPLE 2

A dye with similar properties is obtained by reacting 27.8 parts of the dye obtained from 4-methyl-2-amino-1-oxybenzene and 2-naphthol with 47.4 parts of the 1:1 chromium complex described in Example 1 by an analogous process.

Further dyes which dye polyamide or wool in violet or reddish violet shades are obtained in analogous manner by reacting the 1:1 chromium complexes of the monoazo compounds listed in column I of the Table with the metal-free monoazo compounds listed in column II.

| Nr. | I | II | Shade on wool or polyamide |
|---|---|---|---|
| 1 | (structure with SO₃H, OH, pyrazolone with cyclohexyl) | 2-hydroxyphenyl-N=N-2-naphthol | reddish violet |
| 2 | " | 4-tert-butyl-2-hydroxyphenyl-N=N-2-naphthol | violet |
| 3 | " | 3-nitro-5-methyl-2-hydroxyphenyl-N=N-2-naphthol | violet |
| 4 | " | 5-nitro-2-hydroxyphenyl-N=N-2-naphthol | reddish violet |
| 5 | " | 5-nitro-2-hydroxyphenyl-N=N-2-naphthol | reddish violet |

| Nr. | I | II | Shade on wool or polyamide |
|---|---|---|---|
| 6 | 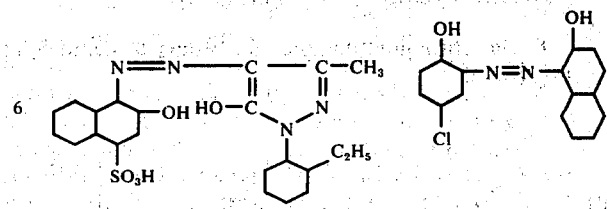 | | violet |
| 7 | 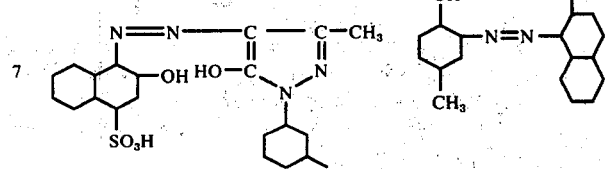 | | violet |
| 8 | 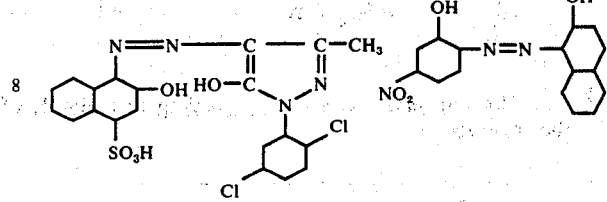 | | violet |
We claim:
1. A chromium complex dye of the formula
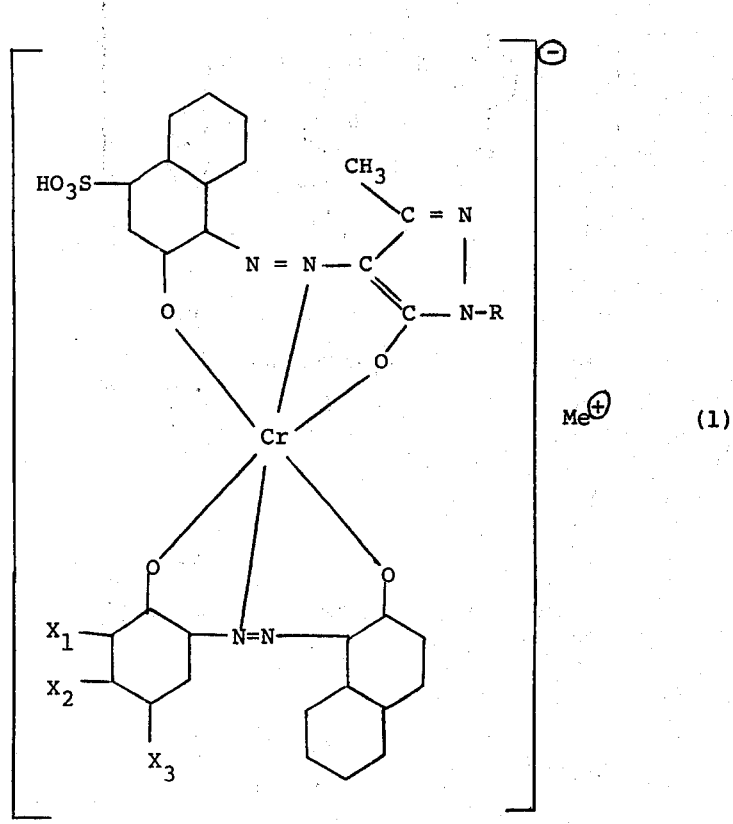

wherein one of the symbols $X_1$, $X_2$ and $X_3$ is hydrogen and each of the others is hydrogen, chloro, nitro or methyl R is phenyl or phenyl substituted by chloro, lower alkyl or nitro and $Me^+$ is a cation.

2. Chromium complex dyes according to claim 1, wherein two of the symbols $X_1$, $X_2$ and $X_3$ are hydrogen and the third is hydrogen, chloro, methyl or nitro.

3. Chromium complexes according to claim 2, wherein each of $X_1$ and $X_2$ represents hydrogen and $X_3$ represents hydrogen, chloro or methyl.

4. The chromium complex according to claim 3, of the formula

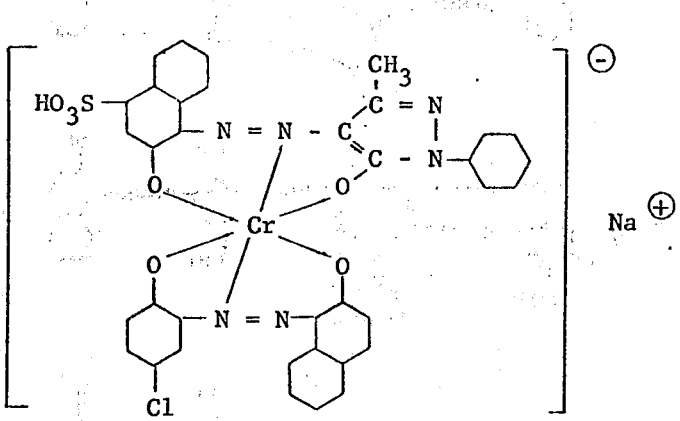

5. The chromium complex according to claim 3, of the formula

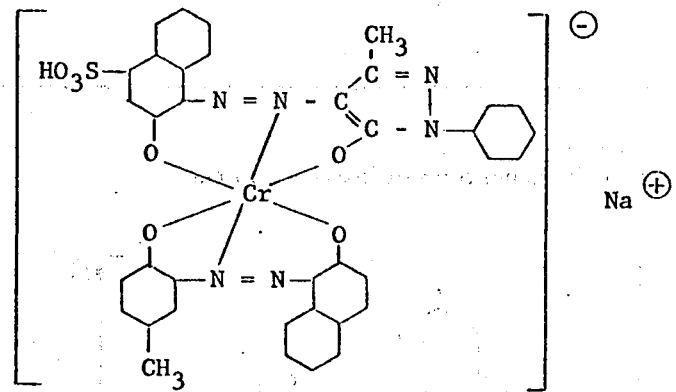

* * * * *